United States Patent
Behiels (10) Patent No.: US 9,619,888 B2
(45) Date of Patent: Apr. 11, 2017

(54) METHOD FOR DEFINING A REGION OF INTEREST IN A RADIATION IMAGE OF A BREAST

(71) Applicant: Agfa HealthCare NV, Mortsel (BE)

(72) Inventor: Gert Behiels, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 179 days.

(21) Appl. No.: 14/375,000

(22) PCT Filed: Feb. 12, 2013

(86) PCT No.: PCT/EP2013/052750
§ 371 (c)(1),
(2) Date: Jul. 28, 2014

(87) PCT Pub. No.: WO2013/120834
PCT Pub. Date: Aug. 22, 2013

(65) Prior Publication Data
US 2015/0010219 A1  Jan. 8, 2015

Related U.S. Application Data (60) Provisional application No. 61/600,111, filed on Feb. 17, 2012.

(30) Foreign Application Priority Data

Feb. 17, 2012 (EP) ..................... 12155979

(51) Int. Cl.
*G06K 9/00* (2006.01)
*G06T 7/00* (2017.01)
*G06K 9/62* (2006.01)

(52) U.S. Cl.
CPC .......... *G06T 7/0081* (2013.01); *G06K 9/6232* (2013.01); *G06T 7/0083* (2013.01); *G06T 2207/30068* (2013.01)

(58) Field of Classification Search
CPC ......... G06T 2207/30068; G06T 7/0081; G06T 7/0083
See application file for complete search history.

(56) References Cited

U.S. PATENT DOCUMENTS

| | | | |
|---|---|---|---|
| 5,796,862 A | * | 8/1998 | Pawlicki ............... G06T 7/0012 382/132 |
| 7,885,443 B2 | | 2/2011 | Zingaretti et al. |
| 2004/0161141 A1 | | 8/2004 | Dewaele |
| 2006/0159321 A1 | | 7/2006 | Takeo et al. |

(Continued)

FOREIGN PATENT DOCUMENTS

WO  WO 2011137409 A1 * 11/2011 ........... G06T 7/0012

OTHER PUBLICATIONS

R. Nevatia "Machine Perception" Ch 07 pp. 100-127 Prentice-Hall, Englewood Cliffs, New Jersy (1982).*

(Continued)

*Primary Examiner* — Bhavesh Mehta
*Assistant Examiner* — Ian Lemieux
(74) *Attorney, Agent, or Firm* — Keating & Bennett, LLP (57) ABSTRACT

A method for defining a region of interest in a radiation image of a breast based on the result of shape analysis applied to a skin line estimate determined in the radiation image.

5 Claims, 8 Drawing Sheets

(56) References Cited

U.S. PATENT DOCUMENTS

2007/0206844 A1     9/2007   Russakoff et al.
2011/0216949 A1     9/2011   Yang

OTHER PUBLICATIONS

L. Vincent, "Minimal path algorithms for the robust detection of linear features in images" in Mathematical Morphology and its Applications to Image and Signal processing, vol. 12 of Computational Imaging and Vision, Amsterdam, Kluwer, Proceedings for ISMM'98, Jun. 1998, pp. 331-338.*
Zheng et al., "Multiview-Based Computer-Aided Detection Scheme for Breast Masses", Medical Physics, AIP, vol. 33, No. 9, Aug. 16, 2006, pp. 3135-3143.
Kus et al., "Fully Automated Gradient Based Breast Boundary Detection for Digitized X-ray Mammograms", Computers in Biology and Medicine, vol. 42, No. 1, Oct. 24, 2011, pp. 75-82.
Official Communication issued in International Patent Application No. PCT/EP2013/052750, mailed on Mar. 25, 2013.
Sun et al., "A new approach for breast skin-line estimation in mammograms", Pattern Analysis and Applications, vol. 9n, No. 1, Apr. 4, 2006, 14 pages.
Marti et al., "Breast Skin-Line Segmentation Using Contour Growing", Pattern Recognition and Image Analysis, Jun. 6, 2007, pp. 564-571.
Pu et al., "An ellipse-fitting based method for efficient registration of breast masses on two mammographic views", Medical Physics, vol. 35, No. 2, Jan. 14, 2008, pp. 1-15.

* cited by examiner

(a) RMLO (b) LMLO (c) RCC (d) LCC

METHOD FOR DEFINING A REGION OF INTEREST IN A RADIATION IMAGE OF A BREAST

CROSS-REFERENCE TO RELATED APPLICATIONS

This application is a 371 National Stage Application of PCT/EP2013/052750, filed Feb. 12, 2013. This application claims the benefit of U.S. Provisional Application No. 61/600,111, filed Feb. 17, 2012, which is incorporated by reference herein in its entirety. In addition, this application claims the benefit of European Application No. 12155979.3, filed Feb. 17, 2012, which is also incorporated by reference herein in its entirety.

BACKGROUND OF THE INVENTION

1. Field of the Invention

The present invention relates to a method of detecting a region of interest in a breast image.

2. Description of the Related Art

Radiologists examine mammographic images to diagnose various abnormalities in a breast. The images are nowadays examined on a display device such as the display screen of a computer workstation.

Essential for a mammographic display system is the ability of the radiologist to quickly analyse the mammographic images of the breast and create a report of his diagnosis.

When examining mammographic images on a computer screen, physicians typically only desire to look at the breast area and not at any of the background.

In order to fill the viewing area of the display device with the breast image, the radiologist uses the zooming and panning functionality of a display device. Normally the user interaction consists of a zoom in operation and a pan operation or consists of a zoom in operation performed after positioning the mouse on the part on which the user want to focus. These operations require manual interaction and are thus time-consuming.

As the radiologist is only interested in the breast area, it is highly desirable to be able to extract this breast area and display it at optimal scale. This would help the radiologist to focus on the diagnostically most relevant part without needing to perform a lot of manual operations such as iterative zooming and panning.

Segmentation of breast images into multiple regions, including a breast region and direct exposure region, for various modalities and vendors turns out to be very difficult. Tuning the segmentation algorithm is inadequate.

US2011/0216949 discloses a computer implemented method for defining a breast window within an image. The method starts for the center region of the breast image and searches from this center region outwards for the breast boundary. Points on the breast boundary are used to define the borders of the breast window. After having defined the breast window, it is optimally scaled, e.g. scaled to the original image scale. In this way finer details of the original image can be examined more accurately. The implementation described in this patent application is rather complex.

U.S. Pat. No. 7,885,443 discloses a method for temporal comparison of breast images. The breast images are displayed on a same mammogram display at an identical tissue distance per unit distance without requiring a scale-adjusting viewer input.

SUMMARY OF THE INVENTION

It is an aspect of the present invention to provide a method of determining the region of interest in a mammographic image so as to enable optimal display of the region of interest.

The above-mentioned aspects are realized by a method as set out below. Specific features for preferred embodiments of the invention are also set out below.

In the context of the present invention the term 'mammographic image', 'mammogram' or 'breast image' refer to a radiation image of a breast. The radiation image of the breast in this invention is provided in the form of a (digital) signal representation wherein the signal values represent grey values of image pixels.

Further in the context of this application 'direct exposure area' or 'background area' means an area part of the radiation image of a breast in which radiation is not attenuated by the breast and has impigned directly onto a radiation detector used for recording the radiation image of the breast.

Also in the context of the present invention the term 'skin line estimate' (also referred to as 'skin line') is defined as the edge between the background area and the remainder of the mammographic image. This skin line is determined by a skin line extraction algorithm described below. The determined skin line may comprise pixels of the breast boundary as well as pixels not belonging to the breast boundary such as chest pixels, markers etc.

Several types of systems exist for generating a radiation image of a breast. Such systems are described furtheron in this specification.

The method according to a preferred embodiment of the present invention is generally implemented in the form of a computer program product adapted to carry out the method steps of the present invention when run on a computer. The computer program product is commonly stored in a computer readable carrier medium or device. Alternatively the computer program product takes the form of an electric signal and can be communicated to a user through electronic communication. Examples are one or more diskettes, compact disks, tapes, chips, wireless transmission devices, internet transmission or downloading devices etc. readable or accessible by computer for configurating and operating the computer when the storage media or device is read by the computer to perform the procedures described herein.

Further advantages and embodiments of the present invention will become apparent from the following description and drawings.

BRIEF DESCRIPTION OF THE DRAWINGS

FIGS. 3(a)-(d) illustrate the segmentation of different clinical views: (a) RMLO, (b) LMLO, (c) RCC, (d) LCC, FIGS. 4(a) and (b) show segmentation masks, FIGS. 4(c) and (d) show optimally scaled images taking into account all foreground pixels, FIGS. 4(e) and (f) show optimally scaled images taking into account all foreground pixels from the largest object, FIG. 4(g) shows a diagnostically optimally scaled image, FIGS. 6(a)-(d) show examples of an extracted skin line, FIGS. 7(a) and (b) illustrate the classification of points to determine the breast area, FIGS. 8(a) and (b) illustrate the extension mechanism to derive the region of interest from the determined breast area.

DETAILED DESCRIPTION OF THE PREFERRED EMBODIMENTS

While the present invention will hereinafter be described in connection with preferred embodiments thereof, it will be understood that it is not intended to limit the invention to those preferred embodiments.

Figure 1:
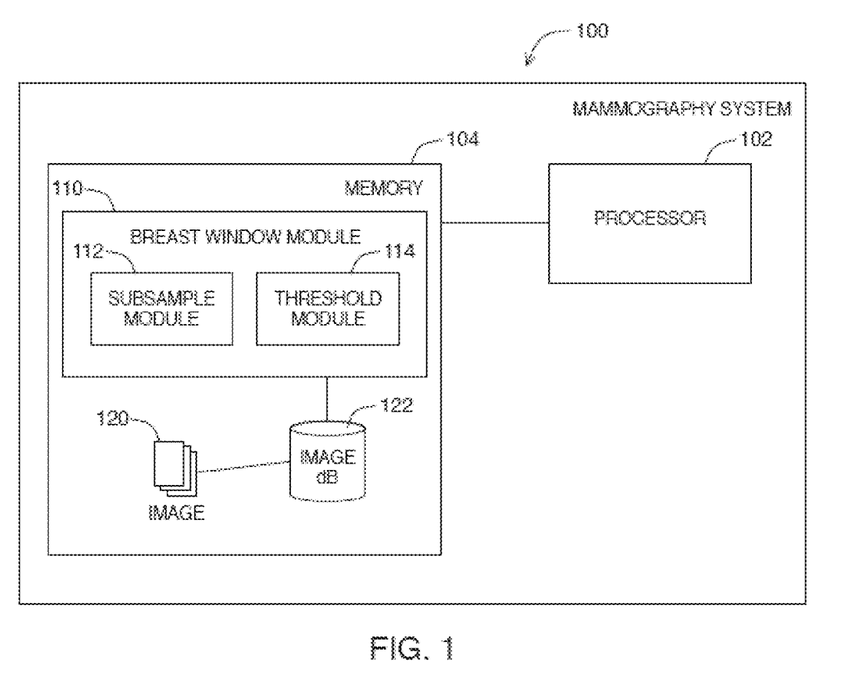
FIG. 1 is an example of a mammographic system.

FIG. 1 shows an example embodiment of a mammography system 100. A mammography system 100 may contain a processor 102, operatively coupled to memory 104. Memory 104 stores a breast window module 110 for defining breast windows on images 120 stored on image database 122.

Images 120 stored on image database 122 may comprise mammography images. Those skilled in the art will appreciate that there are different types of mammography images such as craniocaudal (CC), containing a view of a breast as taken through the top of the breast and mediolateral oblique (MLO), containing a view of a breast as taken from the center of the chest to the lateral of the breast.

Various systems may be envisaged for acquiring a digital signal representation of a radiographic image of the breast such as projection radiography image acquisition systems, echography image acquisition systems, tomosynthesis systems, computed tomography systems etc.

Mammographic image acquisition systems typically comprise a radiation sensitive detector (e.g. x-ray radiation sensitive) for storing an image of an irradiated breast. Examples of suitable detectors are a radiographic film, a photo-stimulable phosphor screen, a direct radiography detector etc. A digital signal representation of the breast image is then obtained by reading out the image from the detector (e.g. by scanning the film, stimulating the photo-stimulable phosphor screen or reading out the direct digital detector) and eventually digitizing the read out signal. The digital signal representation of a mammographic image represents the grey value in each image pixel.

Image database 122 stores breast images 120, and may be implemented using any database software or persistent storage method known in the art. For example, image database 122 may be implemented using Oracle®, Microsoft SQL Server or IBM DB2® with suitably defined schemas to identify and navigate images 120. In the exemplary preferred embodiment, image database 122 may be part of a Picture Archiving and Communication Systems (PACS) deployment, such as those found in a hospital. While image database 122 is illustrated as residing in the same memory as mammography system 100, it will be understood that image database 122 may be stored and accessed remotely through a network connection, for example, using a Digital Imaging and Communications in Medicine (DICOM) protocol. In such case, it will be further understood that the operations of the breast window module 110 may be performed locally on the mammography system, remotely on the system where the image database 122 resides, or on a third-party system configured to access image database 122 and mammography system 100.

According to a preferred embodiment of the present invention a region of interest (ROI) is identified. This region of interest can then be displayed as large as possible to minimize the number of zoom interactions to be performed by the radiologist.

A region of interest is determined by the steps of (1) identifying the boundary of the direct exposure area (i.e. the image area where substantially un-attenuated radiation impinges on the radiation detector) by a direct exposure estimation technique and (2) using this boundary to determine a skin line estimate, e.g. by subjecting it to a minimum cost path algorithm. This skin line estimate is then subjected to a shape analysis procedure and its convex part is used to determine the relevant region of interest (ROI).

When several breast images are displayed, such as images taken at different points in time or different views of the breast, first all relevant regions of interest in these breast images are identified. Then, the display parameters are adjusted such that all relevant regions of interest of all images are displayed at the same physical scale as is described by the IHE Mammography Image Integration Profile. The largest ROI of all images is displayed as large as possible given the constraints of the display device and the same scale factor is used for display of the other ROI's. The system is preferably implemented such that a zoom out operation displays the complete images. In this way, the radiologist can easily revert to a situation with no display scale adjustment.

When displaying the ROI found by the algorithm according to a preferred embodiment of the present invention, zoom in and panning operations requiring a lot of cursor movements are not necessary but replaced with a zoom out operation to make sure that the radiologist has seen all diagnostically relevant pixels. When designed properly, a zoom out operation does not require any additional panning or mouse positioning. This increases the productivity of the radiologist.

The first step of one preferred embodiment of the method of the present invention is a segmentation step which is applied to the digital signal representation of the rendered breast image. In this segmentation step a mask is created indicating direct exposure or background pixels. This segmentation step may also be omitted, e.g. when the gradient image derived from the breast image is used for further analysis.

This mask is in this preferred embodiment constructed in 2 steps: (1) an initial classification step and (2) a step for generation of a sequence of background masks from which the optimal background mask is selected. The optimal background mask is created by an iterative process in which the classification rules are strengthened in each iteration step.

First an initial mask of candidate background pixels is computed based on the grey pixel values in the rendered breast image. In this context the term 'rendered' refers to the image signal obtained by window/level setting and conversion to grey values. In the described exemplary preferred embodiment the rendering of the image uses the default, most conservative, window/level settings found in the DICOM tags associated with the image. The threshold is derived from the histogram of the image and selected such that typically all background pixels are selected with some additional non-background pixels.

Starting from this initial background mask, a sequence of further background masks is generated with a sequence of a so-called second threshold th. The sequence of the second threshold is in this preferred embodiment the initial gray level intensity for the local intensity variability within a search region.

Figure 2:
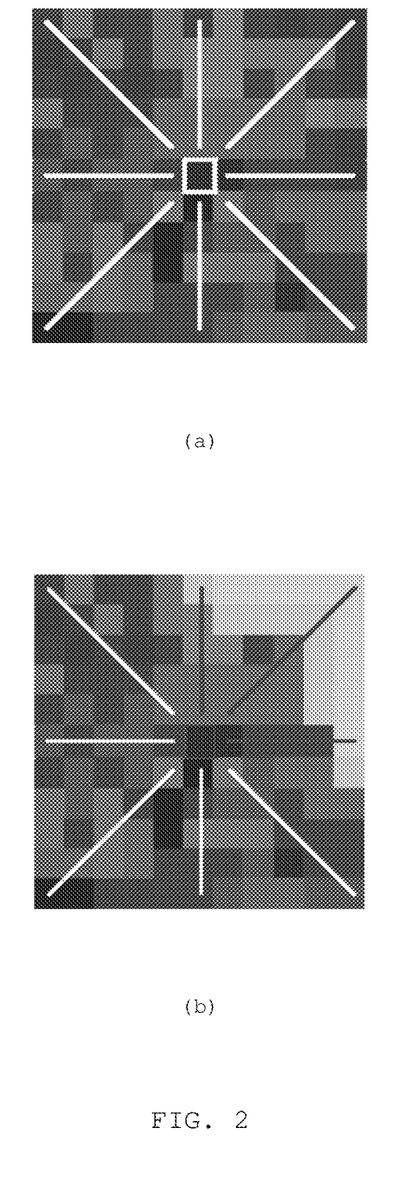
FIG. 2(a) is for an illustrative example of a star-shaped background search area the case where all criteria are valid.
FIG. 2(b) is an illustrative example of the same star-shaped background area whereby the intensity criteria are not valid for angles between 12 and 3 o'clock.

As illustrated in FIG. 2, the search region is in the described preferred embodiment defined as a star defining a number (in this preferred embodiment: 8) radial search directions.

The difference between two successive masks is computed and used as a selection criterium for the most suitable background mask. As a measure of this selection criterium the difference is used between the number of background pixels in the 2 masks. The final background mask is the mask which shows minimum difference with the next mask in the sequence of segmentation masks.

Alternative forms of search regions (other forms or patterns of search area) and selection criteria may be envisaged.

Preferably each image in the sequence for a specified threshold th, is computed using the following classification rules for all pixels i:
1. the pixel must be a candidate background pixel in the initial background mask
2. there is no pixel at a distance of 2 pixels which is not an initial background pixel
3. no pixel is found along one of 8 search directions radiating outwards of pixel i which exceeds a varying threshold $t_{var}$ over a fixed distance. $t_{var}$ is initialized with the intensity value of pixel i scaled with the specified threshold th for the mask in the sequence. The varying threshold $t_{var}$ is adjusted with a fraction of the central intensity value at pixel i. The fraction with which $t_{var}$ is adjusted may also be dependend on the intensity value of the pixel under investigation. E.g. the update can be smaller if the pixel under investigation is smaller than the intensity value for the central pixel.

As an additional step, small or irregular regions within the optimal background mask can be identified and removed.

Figure 3:
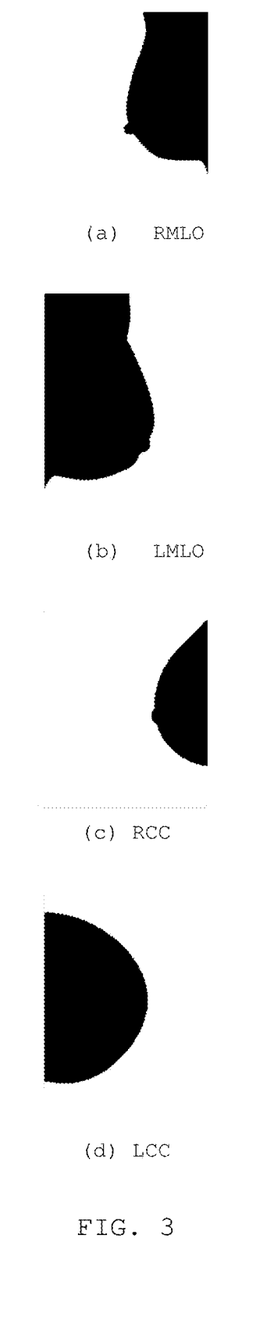

Some results of the segmentation algorithm are shown in FIG. 3.

The next step of the described preferred embodiment of the method of the present invention is the step of determining the breast boundary.

In the previous section, an algorithm has been presented which is capable of determining the background pixels quite accurately. The presentation of the masks shown in FIG. 3 suggest that determination of a ROI which covers all pixels which are labeled as non-background or foreground is suitable to determine the optimal zoom factor. In this section, some examples are shown to illustrate that a more advanced technique is required to determine the optimal zoom factor.

Figure 4:
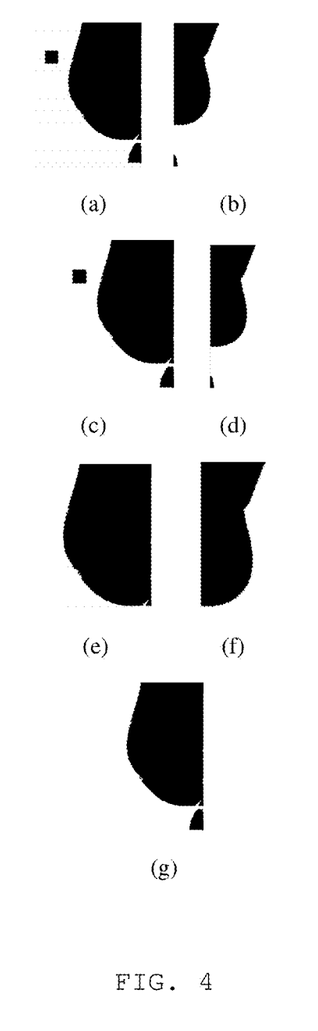

Consider the presence of a lead marker to identify the clinical view or the presence of a small part of the abdomen. Some examples are illustrated in FIG. 4a-b. The resulting ROIs when using all foreground pixels are displayed in FIG. 4c-d. It is clear that the scale factor is not optimal due to the presence of some foreground pixels which are not breast related. One solution to the wrongly determined scale factor is to take into account only the foreground pixels belonging to the largest object in the segmentation mask. This strategy will generate good results for many cases but when looking at FIGS. 4a and e, it is possible that FIG. 4g might be preferred.

Figure 5:
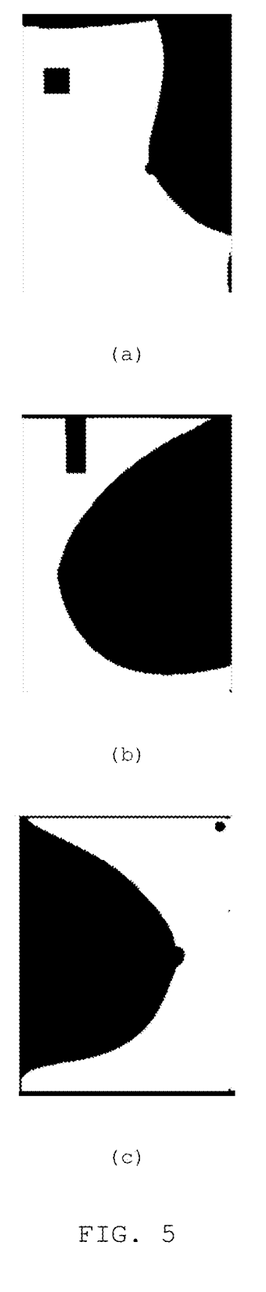
FIGS. 5(a)-(c) illustrate the need of a high performance selection method for selection of the breast region.

FIG. 5 illustrates that a more advanced selection mechanism is needed than the simple selection of the breast region in the segmentation masks because the segmentation algorithm may add some pixels which are not breast tissue to the largest object from the segmentation mask and because some diagnostically relevant parts of the image are not connected to the breast.

Skin line estimate In order to solve the problems identified in the previous section without modifying the segmentation algorithm, the skin line estimate is first determined and used for determining the breast contour.

Figure 6:
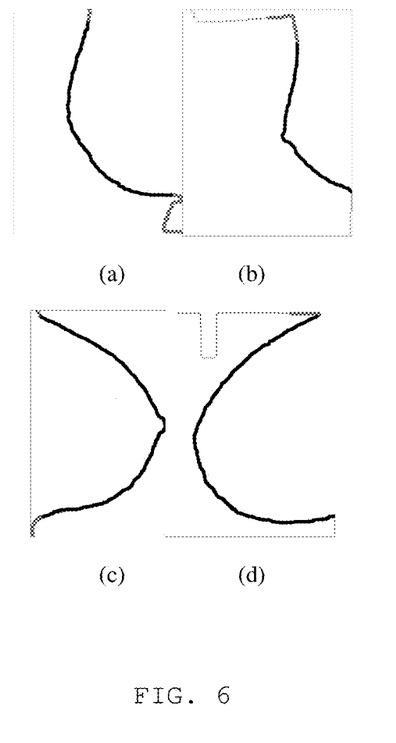

The skin line estimate is in the described preferred embodiment identified by means of a minimal cost path technique applied to the selected optimal mask defining direct exposure pixels. In the described preferred embodiment the cost for pixels on the edge of the direct exposure area are set to a low value e.g. 2 and the cost to traverse any other pixel is set to a high level e.g. 255. By applying standard dynamic programming techniques a path can be found from the bottom of the image located at the side of the breast to the top of the image. Some examples of extracted skin lines are shown in FIG. 6.

Alternative methods may be envisaged for determining the skin line estimate (such as identifying border points of the largest object in the image etc).

The above-described segmentation algorithm may be omitted, e.g. if the minimum cost path analysis is applied to the gradient image deduced from the radiation image of the breast.

Figure 7:
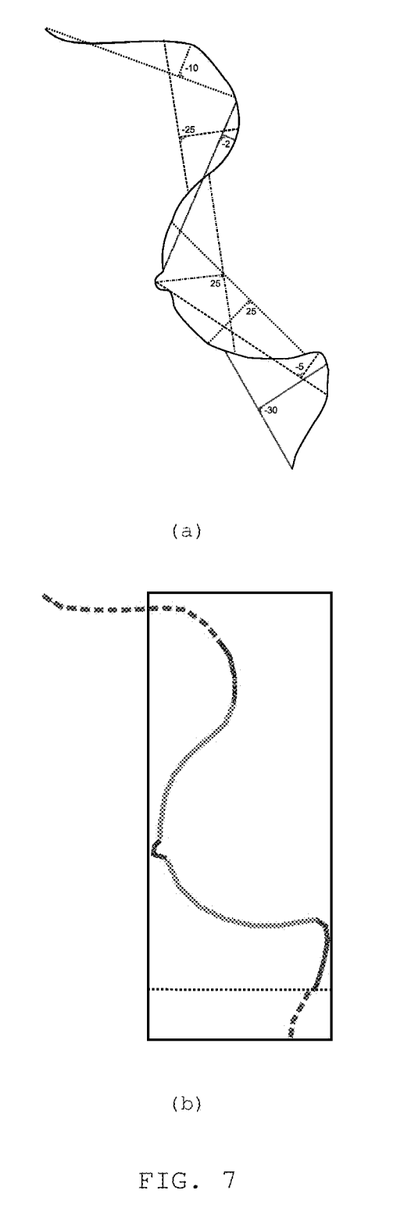

Having found the skin line, the points of the skin line are marked as a point belonging to the breast boundary by subjecting it to a shape analysis procedure. In one preferred embodiment this shape analysis procedure is implemented by computing a measure which is an indication of convexity and evaluating this measure with regard to a given tolerance value. The measure is computed and evaluated as follows:
1. Take one point from the set of skin line points
2. Take a second point located a fixed number positions further in the set of skin line points
3. Connect these two points with a line
4. Compute the signed distance for all intermediate points on the skin line with this line
5. Mark both points as convex points if the minimum of the signed distance of all intermediate points of step 4 is greater than 0
6. Mark each point as extension point if the signed distance is larger than a defined threshold and the point is not already marked as breast point.

The above algorithm is illustrated in FIG. 7a.

Alternatives for the above described shape analysis method may be envisaged such as analysis of curvature, of Fourier descriptors, of curvelets, Eigenshape analysis/PCA (Principal Component analysis) etc.

The final breast boundary is then determined as the segment of convex and extension points containing the longest segment of convex points. In the example of FIG. 7b, the threshold is set to a minimum of −10.

Region of Interest

Various strategies exist to determine a suitable ROI after having found the convex part of the skin line.

In this section ROI definition for an MLO image is illustrated as an example.

For all clinical views, the width of the ROI may be determined by the most extreme point of the breast boundary and the edge of the image where the breast is positioned. So the convex part of the skin line determines the width of the optimal ROI.

Next the optimal height is to be determined. In one preferred embodiment, the top point of the ROI (point through which a horizontal ROI delineation runs) is initially taken as the highest point of the breast boundary. This point is moved upwards as long as there are foreground pixels at the edge of the image where the breast is positioned. For MLO images, this usually means that the ROI is extended to the top edge of the image.

The same mechanism is applied to find the bottom point of the ROI.

In one preferred embodiment the region of interest is a rectangle defined by the width, top edge and bottom point as determined higher.

Figure 8:
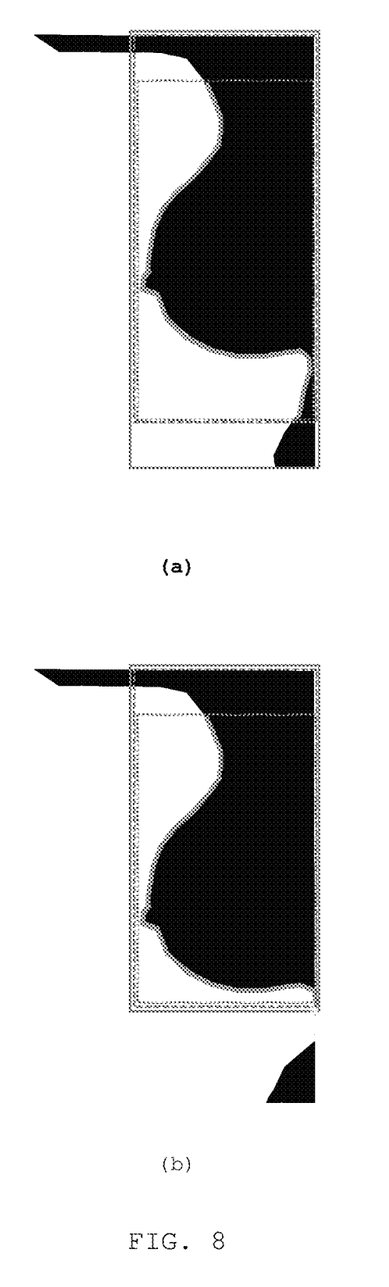

The technique is illustrated in FIG. 8. For FIG. 8a the ROI is extended to the top of the image because it is an MLO image and extended to the bottom of the image because there are several foreground pixels at the edge of the image below the lowest skin-line point. For FIG. 8b, the extension to the bottom is not done because there are no foreground pixels at the lowest point of the skin line at the edge of the image.

One the ROI is delineated, it can be scaled for optimal viewing on the display device. Optimally the ROI is displayed as large as possible on the display device.

In case of multiple images to be viewed, the region of interest is determined in each of the images. The largest ROI is then preferably displayed as large as possible given the constraints of the display device and all other ROI's are displayed at the same scale as described in the IHE Mammographic Image Integration Profile.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for defining a region of interest in a radiation image of a breast by determining a breast boundary and delineating the region of interest on a basis of the determined breast boundary, the method comprising the steps of:
   determining a skin line estimate in the radiation image and subjecting the skin line estimate to a shape analysis procedure including an evaluation of a measure of convexity relative to a given tolerance value so as to determine convex points; and
   forming the breast boundary as a longest segment of the convex points supplemented with extension points determined by evaluating the measure of convexity with a lower tolerance value than the given tolerance value; wherein
   a top point of the region of interest is determined by considering a highest point of the determined breast boundary and moving the highest point upwards in the radiation image as long as there are foreground pixels above an upper edge of the radiation image including the breast; and
   a bottom point of the region of interest is determined by considering a lowest point of the determined breast boundary and moving the lowest point downwards in the radiation image as long as there are foreground pixels below a lower edge of the radiation image including the breast.

2. The method according to claim 1, wherein points of the skin line estimate are classified as the convex points belonging to the breast boundary by repeating, a number of times, the steps of:
   for a first point in a set of points of the skin line estimate, considering a second point in the set of points;
   connecting the first point and the second point with an imaginary line;
   computing a signed distance for each of a set of intermediary points on the skin line estimate between the first point and the second point with the imaginary line; and
   designating the first point and the second point as the convex points if a minimum of the signed distances for the set of intermediate points is greater than 0.

3. The method according to claim 1, wherein the skin line estimate is obtained by the steps of:
   segmenting the radiation image to create a mask indicating pixels of direct exposure area; and
   subjecting the mask to a minimal cost path technique.

4. The method according to claim 1, wherein a width of the region of interest is determined by a most extreme point of the breast boundary and an edge of the radiation image at a side where the breast is positioned.

5. A non-transitory computer readable medium comprising computer executable program code for carrying out the steps of claim 1 when the computer executable program code runs on a computer.

* * * * *